US012645456B1

(12) United States Patent
Cathrine et al.

(10) Patent No.: US 12,645,456 B1
(45) Date of Patent: Jun. 2, 2026

(54) PREFETCHING TO RETRIEVE CONTENT FROM A MEMORY SYSTEM

(71) Applicant: Arm Limited, Cambridge (GB)

(72) Inventors: Damien Matthieu Valentin Cathrine, Mougins (FR); Ugo Castorina, Biot (FR); Diogo Augusto Pereira Marques, Antibes (FR); Henrique Duarte Hachmeister Caraça, Zurich (CH)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 18/967,852

(22) Filed: Dec. 4, 2024

(51) Int. Cl.
*G06F 9/30* (2018.01)
*G06F 9/355* (2018.01)
*G06F 9/38* (2018.01)

(52) U.S. Cl.
CPC .......... *G06F 9/30047* (2013.01); *G06F 9/355* (2013.01); *G06F 9/3806* (2013.01)

(58) Field of Classification Search
CPC ..... G06F 9/30047; G06F 9/355; G06F 9/3806
USPC ................................................. 711/137, 118
See application file for complete search history.

(56) References Cited

U.S. PATENT DOCUMENTS 6,173,392 B1 * 1/2001 Shinozaki ............... G06F 9/383
711/213
8,364,902 B2 * 1/2013 Hooker ............... G06F 12/0862
712/207

2003/0041214 A1 2/2003 Hirao
2022/0019537 A1 * 1/2022 Roberts .............. G06F 12/0891
2023/0107660 A1 4/2023 Rushing

OTHER PUBLICATIONS

Office Action dated Dec. 5, 2025 for U.S. Appl. No. 18/955,045, 20 pages.

(Continued)

*Primary Examiner* — Hosain T Alam
*Assistant Examiner* — Zubair Ahmed
(74) *Attorney, Agent, or Firm* — NIXON & VANDERHYE P.C.

(57) ABSTRACT

There are provided apparatuses, methods, systems, chip-containing products and computer-readable storage media. Prefetching retrieves content from a memory system. History storage stores plural entries, each identifying a basic block of memory addresses, wherein the basic block of memory addresses is a contiguous range of memory addresses from which content has been requested to be retrieved from the memory system. An entry order of the plural entries corresponds to a basic block order in which corresponding basic blocks have been requested to be retrieved from the memory system. An entry-order-older basic block is associated with with an entry-order-younger basic block for which respective entries are stored in the history storage circuitry, these basic blocks being separated by at least a defined minimum number of entries in entry order in the history storage. A sequence of request addresses from which content is requested to be retrieved from the memory system is monitored. When a requested address corresponds to the entry-order-older basic block prefetching corresponding to the entry-order-younger basic block is triggered.

20 Claims, 9 Drawing Sheets

(56)                     References Cited

OTHER PUBLICATIONS

Reza Azimi, Livio Soares, Michael Stumm, Thomas Walsh, and Angela Demke Brown. 2007. "Path: page access tracking to improve memory management" In Proceedings of the 6th international symposium on Memory management (ISMM '07). Association for Computing Machinery, New York, NY, USA, Oct. 21-22, 2007, pp. 31-42. (Year: 2007).

Ohba, N., Munetoh, S., Okazaki, A., Katayama, Y. (2014). "Non-intrusive Scalable Memory Access Tracer" In: Norman, G., Sanders, W. (eds) Quantitative Evaluation of Systems. QEST 2014. Lecture Notes in Computer Science, vol. 8657. Springer, Cham. (Year: 2014), 4 pages.

Alberto ROS, et al., "A Cost-Effective Entangling Prefetcher for Instructions", 2021 ACM/IEEE 48th Annual International Symposium on Computer Architecture (ISCA), Jun. 2021, 13 pages.

Caraça, U.S. Appl. No. 18/955,045, filed Nov. 21, 2024.

* cited by examiner

| Basic block |
|---|
| Basic block |
| Basic block |
| Basic block |
| Basic block |
| Basic block |
| Basic block |
| Basic block |

BB entry order

| OV | Basic block |
|---|---|
| OV | Basic block |
| OV | Basic block |
| OV | Basic block |
| OV | Basic block |
| OV | Basic block |
| OV | Basic block |
| OV | Basic block |

| Entry order | | Dst BB |
|---|---|---|
| 0 | Basic block | 3 |
| 1 | Basic block | 5 |
| 2 | Basic block | - |
| 3 | Basic block | 6 |
| 4 | Basic block | - |
| 5 | Basic block | - |
| 6 | Basic block | - |
| 7 | Basic block | - |

Minimum separation

FIG. 4A

| Entry order | | Dst BB | |
|---|---|---|---|
| 0 | Basic block | 3 | Conf |
| 1 | Basic block | 5 | Conf |
| 2 | Basic block | - | Conf |
| 3 | Basic block | 6 | Conf |
| 4 | Basic block | - | Conf |
| 5 | Basic block | - | Conf |
| 6 | Basic block | - | Conf |
| 7 | Basic block | - | Conf |

FIG. 4B

| Entry order | | Src BB | Dst BB | |
|---|---|---|---|---|
| 0 | Basic block | S | - | - |
| 1 | Basic block | - | - | - |
| 2 | Basic block | - | - | - |
| 3 | Basic block | - | D | Conf |
| 4 | Basic block | - | D | Conf |
| 5 | Basic block | - | D | Conf |
| 6 | Basic block | - | D | Conf |
| 7 | Basic block | - | D | Conf |

FIG. 5

Entry order 150

| 0 | Basic block |
|---|-------------|
| 1 | Basic block |
| 2 | Basic block |
| 3 | Basic block |
| 4 | Basic block |
| 5 | Basic block |
| 6 | Basic block |
| 7 | Basic block |

151

| Source BB | Destination BBs and confidences | | | |
|-----------|------------|------------|------------|------------|
| SRC_0 | DST_0 (conf) | DST_1 (conf) | DST_2 (conf) | DST_3 (conf) |
| SRC_1 | DST_4 (conf) | DST_5 (conf) | DST_6 (conf) | - |
| - | - | - | - | - |
| - | - | - | - | - |

FIG. 6

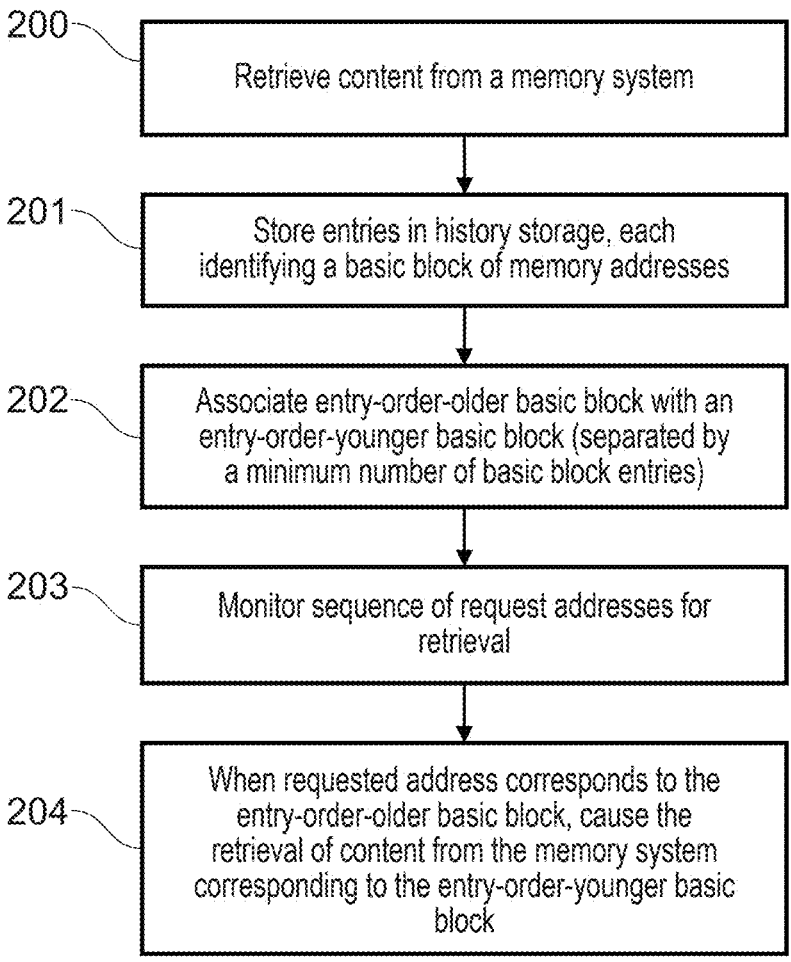

200 — Retrieve content from a memory system

201 — Store entries in history storage, each identifying a basic block of memory addresses 202 — Associate entry-order-older basic block with an entry-order-younger basic block (separated by a minimum number of basic block entries)

203 — Monitor sequence of request addresses for retrieval

204 — When requested address corresponds to the entry-order-older basic block, cause the retrieval of content from the memory system corresponding to the entry-order-younger basic block

FIG. 7

PREFETCHING TO RETRIEVE CONTENT FROM A MEMORY SYSTEM

TECHNICAL FIELD

The present invention relates to data processing. More particularly the present invention relates to an apparatus, a system, a chip containing product, a method, and a computer-readable medium.

BACKGROUND

Some date processing apparatuses are provided with prefetch circuitry configured to retrieve content from a memory system, whereby this prefetching is based on an expectation of content expected to be required for data processing. By thus initiating the retrieval of such content sooner, the latency involved with its retrieval from the memory system can be reduced or even largely avoided entirely.

SUMMARY

According to one configuration there is provided an apparatus comprising:
  prefetch circuitry configured to retrieve content from a memory system;
  history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and
  control circuitry configured to:
associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system,
    and in response to a requested address in the sequence of request addresses corresponding to the entry-order-older basic block to cause the prefetch circuitry to retrieve content from the memory system corresponding to the entry-order-younger basic block.
  According to another configuration there is provided a system comprising:
    the apparatus of the above configuration, implemented in at least one packaged chip;
    at least one system component; and
    a board, wherein the at least one packaged chip and the at least one system component are assembled on the board.
  According to another configuration there is provided a chip-containing product comprising the above-mentioned system configuration, wherein the system is assembled on a further board with at least one other product component.
  According to another configuration there is provided a method comprising:
    retrieving content from a memory system;

storing a plurality of entries in history storage circuitry, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system;
    associating an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry;
    monitoring a sequence of request addresses from which content is requested to be retrieved from the memory system; and
    in response to a requested address in the sequence of request addresses corresponding to the entry-order-older basic block to causing the retrieval of content from the memory system corresponding to the entry-order-younger basic block.
  According to another configuration there is provided a non-transitory computer-readable medium storing computer-readable code for fabrication of an apparatus comprising:
    prefetch circuitry configured to retrieve content from a memory system;
    history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and
    control circuitry configured to:
  associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system,
    and in response to a requested address in the sequence of request addresses corresponding to the entry-order-older basic block to cause the prefetch circuitry to retrieve content from the memory system corresponding to the entry-order-younger basic block.

BRIEF DESCRIPTION OF THE DRAWINGS

The present invention will be described further, by way of example only, with reference to configurations thereof as illustrated in the accompanying drawings, in which.

FIGS. 4A and 4B schematically illustrate history storage according to some example configurations;

FIG. 5 schematically illustrates history storage according to some example configurations;

FIG. 6 schematically illustrates history storage according to some example configurations;

FIG. 7 is a flow diagram showing a sequence of steps according to some example configurations;

DESCRIPTION OF EXAMPLE CONFIGURATIONS

Figure 1:
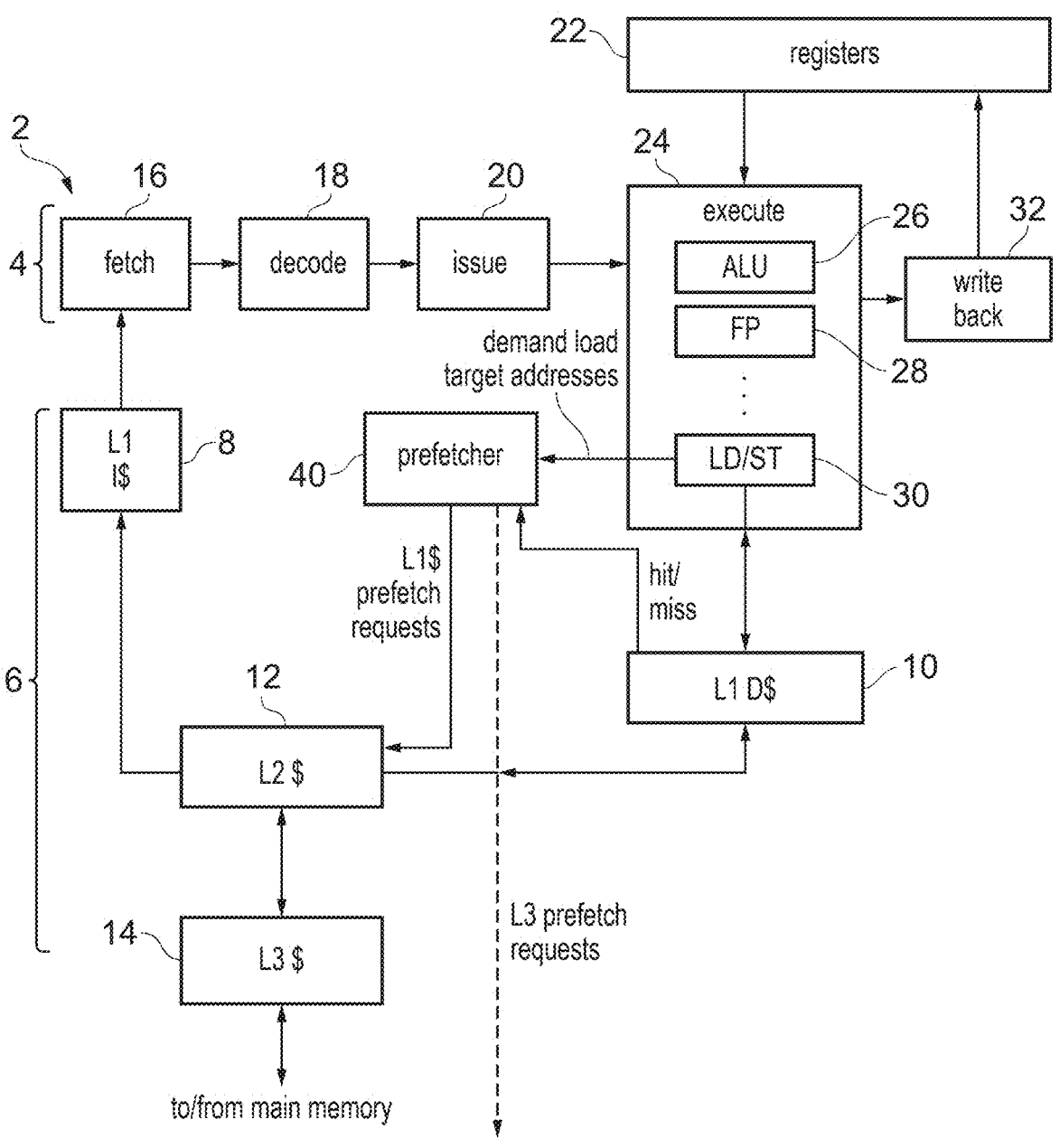
FIG. 1 schematically illustrates an apparatus according to some example configurations.

Before discussing the configurations with reference to the accompanying figures, the following description of configurations is provided.

In some configurations there is an apparatus comprising prefetch circuitry configured to retrieve content from a memory system. History storage circuitry is configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system. Control circuitry is configured to: associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

The inventors of the present techniques have found that basic blocks, that is contiguous range of memory addresses, from which content has been requested to be retrieved from the memory system, can form a useful basis for administering prefetching of content from a memory system. In particular, by monitoring the request addresses from which content is requested to be retrieved from the memory system, it can be established that when certain basic blocks are retrieved it is common that certain other basic blocks are then frequently retrieved within a subsequent limited time period. Nevertheless, it has further been found that linking later retrieved basic blocks with earlier retrieved basic blocks on the basis of their respective timings (e.g. a given time offset between the retrieval of the earlier retrieved basic blocks and the later retrieved basic blocks) would require a relatively high hardware cost due to the counters that are then required to track these time offsets. In this context, the inventors of the present techniques have found that a timing-less association of basic blocks can be implemented, on the basis of a basic block count between an earlier retrieved basic block and a later retrieved basic block, which nonetheless provides empirically useful input to a prefetcher. In particular, when the basic block count between the earlier retrieved basic block and the later retrieved basic block is constrained to be at least a defined minimum number of basic blocks (corresponding to entries in the history storage circuitry), a suitable timeliness of the prefetching is achieved.

A basic block, as stated above, represents a contiguous range of memory addresses, thus being a group or set of instructions that follow in an uninterrupted sequence in program counter order. One example of the occurrence of such a sequence of instructions is those instructions that are comprised between branch instructions, i.e., flow altering instructions that cause the instructions to be executed in an order other than the sequential order defined by the program counter. Accordingly, once a first instruction of such a basic block sequence is identified as requiring execution, then it is also known that each subsequent instruction in that sequence forming the basic block will also require execution. It is to be noted that, where the retrieval of data (i.e. data values or instructions) from a memory system is typically performed in units of cache lines, a basic block may therefore be considered (or indeed defined) as a contiguous sequence of cache lines.

The entry order of the plurality of entries in the history storage circuitry may be administered in a variety of ways. In some examples, the entry order of the plurality of entries in the history storage circuitry corresponds to an indexing of the history storage circuitry. In some examples, the entry order of the plurality of entries in the history storage circuitry is indicated by an entry order value respectively stored in association with each entry of the history storage circuitry.

The history storage circuitry may be configured as a linear storage structure, but in some example is configured as a rolling buffer.

In some examples, the sequence of request addresses monitored by the control circuitry comprises demand addresses. In some examples, the sequence of request addresses monitored by the control circuitry comprises prefetch addresses. Accordingly, the prefetching may be triggered by demand addresses (i.e. those holding content that is explicitly required by the programmed data processing being carried out) or by prefetch addresses (i.e. those holding content that is predicted to be required by the programmed data processing being carried out).

In some examples, the entry-order-older basic block and the entry-order-younger basic block are separated by at most a maximum number of entries in the history storage circuitry.

In some examples having a separation which is a maximum number of entries, the history storage circuitry is configured to store a plurality of entries that is at least the maximum number of entries. For example, the history storage circuitry may be configured to be slightly larger than the maximum number of entries since this allows there to be a choice for the source block (entry-order-older basic block). The number of entries in entry order in the history storage circuitry that separate the entry-order-older basic block and the entry-order-younger basic block has a minimum value. In some examples, the entry-order-older basic block and the entry-order-younger basic block are separated by at least a predefined static number of entries in the history storage circuitry. That is, the minimum value does not change.

In other examples, the minimum separation of the entry-order-older basic block and the entry-order-younger basic block is a dynamically variable number of entries in the history storage circuitry. The dynamic variation of the minimum separation may be based on a range of factors. In some examples, the control circuitry is configured to vary the dynamically variable number of entries in the history storage circuitry in dependence on at least one performance metric. For example this may be a performance metric relating to the prefetcher or may be a performance metric relating to the execution of instructions by an associated data processing pipeline.

In some examples, the history storage circuitry is configured to store a confidence value associated with each of the plurality of entries, and wherein causing the prefetch circuitry to retrieve content from the memory system corresponding to the entry-order-younger basic block is dependent on the confidence value associated with the entry-order-younger basic block meeting a confidence threshold. The further inclusion of a confidence value threshold that must be met in order to trigger the prefetch circuitry to retrieve content enables a further degree of control over the prefetching based on the control of the confidence value.

In some examples, the control circuitry is configured to associate a set of entry-order-younger basic blocks with the entry-order-older basic block. Correspondingly, the observation of the entry-order-older basic block can then be the trigger for the prefetch circuitry to retrieve content associated with any or all of the set of entry-order-younger basic blocks.

In some examples, the control circuitry is configured, when monitoring the sequence of request addresses from which content is requested to be retrieved from the memory system, and when the requested address in the sequence of request addresses corresponds to the entry-order-older basic block to cause the confidence values associated with the set of entry-order-younger basic blocks to be decreased. This provides a useful mechanism for ensuring that, over time, the confidence values associated with the set of entry-order-younger basic blocks to be reduced, i.e. as time passes, without further confirmation that these entry-order-younger basic blocks will be subsequently required, the likelihood of prefetching these basics blocks is correspondingly reduced.

In some examples, the control circuitry is configured, after the requested address in the sequence of request addresses corresponds to the entry-order-older basic block and when a subsequent requested address in the sequence of request addresses corresponds to one of the set of entry-order-younger basic blocks, to cause the confidence value associated with an entry-order-younger basic block corresponding to the subsequent requested address to be increased. Accordingly, in addition to the above-mentioned time-based reduction in the confidence associated with a given basic block, the observation of that basic block, following the entry-order-older basic block with which it is associated, thus increases the confidence in this association and the confidence value can then be increased to reflect this. In some examples, the confidence value associated with the entry-order-younger basic block corresponding to the subsequent requested address is set to a maximum value.

Conversely, when a new basic block is seen to follow the entry-order-older basic block, the opportunity can be taken to update the history storage to reflect this, and amongst the existing set of entry-order-younger basic blocks a victim to be replaced can be chosen based on its (low) confidence value. Accordingly in some examples, the control circuitry is configured, after the requested address in the sequence of request addresses corresponds to the entry-order-older basic block and when a subsequent requested address in the sequence of request addresses does not correspond to one of the set of entry-order-younger basic blocks, to cause a new entry identifying a new basic block of memory addresses corresponding to the subsequent requested address to replace a victim entry of the set of entry-order-younger basic blocks for which the confidence value is below a victim threshold.

Equally, when a new basic block is observed, and the confidences of the existing set of entry-order-younger basic blocks remain relatively high (above the victim threshold), then the opportunity can be taken to establish the new basic block itself as the basis for further association with later (younger) basic blocks. Accordingly in some examples, when none of the set of entry-order-younger basic blocks has the confidence value below the victim threshold, the control circuitry is configured to cause a new source entry identifying a new source basic block of memory addresses corresponding to the subsequent requested address to be stored in the history storage circuitry, wherein the control circuitry is then configured to associate a new set of entry-order-younger basic blocks with the new source basic block as the entry-order-older basic block.

In some configurations, there is a system comprising:
   the apparatus of any of the preceding examples implemented in at least one packaged chip;
   at least one system component; and
   a board,
   wherein the at least one packaged chip and the at least one system component are assembled on the board.

In some configurations, there is a chip-containing product comprising the system of the above configuration, wherein the system is assembled on a further board with at least one other product component.

In some configurations, there is a method comprising:
   retrieving content from a memory system;
   storing a plurality of entries in history storage circuitry, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system;
   associating an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry;
   monitoring a sequence of request addresses from which content is requested to be retrieved from the memory system; and
   in response to a requested address in the sequence of request addresses corresponding to the entry-order-older basic block to causing the retrieval of content from the memory system corresponding to the entry-order-younger basic block.

In some configurations, there is a non-transitory computer-readable medium storing computer-readable code for fabrication of an apparatus comprising:
   prefetch circuitry configured to retrieve content from a memory system;
   history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and control circuitry configured to:

associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

Particular configurations will now be described with reference to the figures.

FIG. 1 illustrates an example of a data processing apparatus 2. The apparatus has a processing pipeline 4 for processing program instructions fetched from a memory system 6. The memory system (memory hierarchy) in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating-point unit 28 for performing operations involving operands or results represented as a floating-point number. In addition, the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also, a memory management unit could be provided for controlling address translation between virtual addresses specified by the program instructions and physical addresses used by the memory system.

As shown in FIG. 1, the apparatus 2 has a prefetcher 40 for analysing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests, which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests that are sent to the level 2 cache 12 or downstream memory and request that data from prefetch target addresses is brought into the level 1 data cache 10. Also, the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However, it will be appreciated that the particular caches loaded based on the prefetch requests may vary depending on the particular circuit of implementation.

It would be readily apparent to the skilled person that a stride based prefetcher, such as the one described in relation to FIG. 1 is merely one example of a possible prefetcher. The prefetcher may, in some configurations, predict access patterns based on a producer-consumer relationship between two memory access instructions. The person of ordinary skill in the art would appreciate that the prefetch generation circuitry can be of any form and use any algorithm to generate the prefetch requests.

Figure 2:
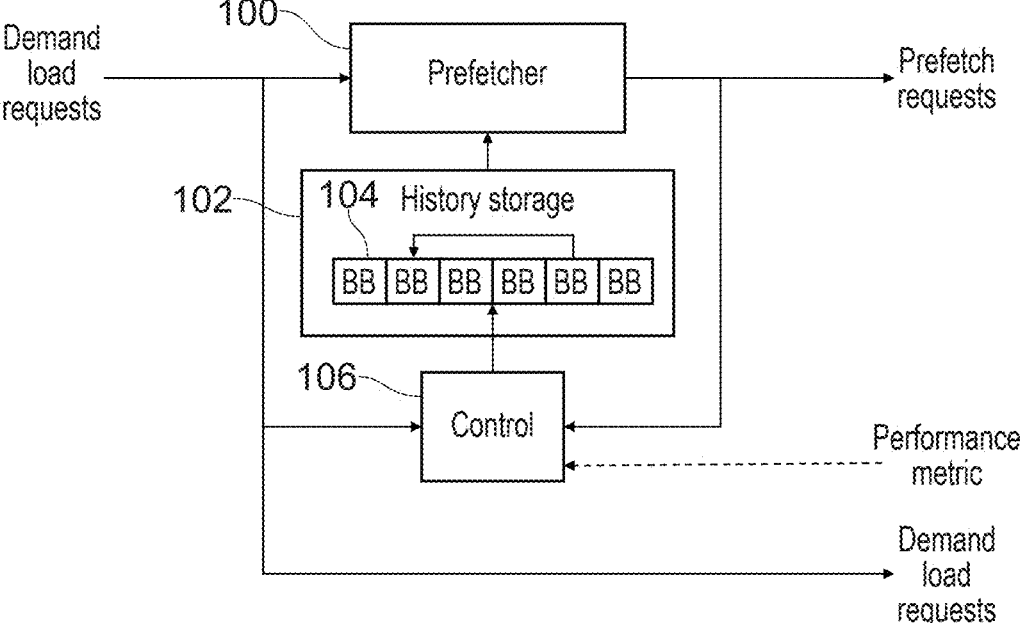
FIG. 2 schematically illustrates an apparatus according to some example configurations.

FIG. 2 schematically illustrates an apparatus in accordance with some examples. The apparatus may be integrated with (whether directly as part of, or distinct from but associated with) the prefetcher 40 in the example of FIG. 1. In such a configuration the prefetcher 40 and the prefetcher 100 are then essentially representative of the same component. In FIG. 2 the apparatus further comprises history storage 102, which itself comprises storage entries 104 configured to store indications of basic blocks observed in the request addresses from which content is requested to be retrieved from a memory system. The apparatus further comprises control circuitry 106. The control circuitry 106 receives indications of demand load requests. These indications of demand load requests are also received by the prefetcher 100, on the basis of which the prefetcher is configured to seek to establish patterns of addresses being accessed and on the basis of those patterns to generate prefetch requests, seeking to populate local caches with content before that content is explicitly requested (by a demand load request). The control circuitry 106 determines basic blocks of memory addresses, that is, contiguous ranges of memory addresses amongst the demand load requests. Indications of these basic blocks (e.g. indications of a start and end address, or a start address and a number of consecutive addresses, etc.) are caused to be stored in the entries 104 of the history storage. An entry order of the basic blocks is preserved, either by virtue of the indexing of the entries, or by the storage of an entry order value in association with each entry. The control circuitry 106 is further configured to associate an entry-order-older basic block with an entry-order-younger basic block for which respective entries are stored in the history storage circuitry. The entry-order-older basic block may be referred to as a "source basic block" and the entry-order-younger basic block may be referred to as a "destination basic block" herein. These two basic blocks are constrained to be separated by at least a defined minimum number of entries in entry order in the history storage circuitry. In other words, there must be at least a defined minimum number of basic blocks that are observed in the interim between the entry-order-older basic block and the entry-order-younger basic block. In some examples a maximum number of basic blocks between the entry-order-older basic block and the entry-order-younger basic block may also be imposed. This maximum can be dictated by the size of the history storage 102, e.g. that the maximum is slightly less than number of entries that the history storage can store. The monitoring of the demand load requests by the control circuitry is a continuous ongoing process and, when the control circuitry observes a requested address in the sequence of request addresses that corresponds to the entry-order-older basic block, it causes the prefetch circuitry to retrieve content from the memory system corresponding to the entry-order-younger basic block. Note that in the example shown, the control circuitry 106 is further configured to receive indications of prefetch requests, such that the basic blocks, indications of which are stored in the entries 104 of the history storage, may either correspond to demand requests or to prefetch requests, or to a combination of the two. The defined minimum number of basic blocks which separate those basic blocks that are associated by the control circuitry 106 remains static in some examples. However, in other examples, this separation can be dynamically varied. The control circuitry 106 may determine a variation in the separation based on one or more factors, but in some examples (as illustrated by the dashed line in the figure) the control circuitry 106 receives one or more performance metric indications e.g. from the prefetcher or from another system component. The performance metric can related to the execution of instructions by an associated data processing pipeline, in particular to throughput of instructions, and the separation can then be varied to seek to improve that throughput. It should further be noted that, in determining the basic blocks of memory addresses, the control circuitry 106 may also determine that a newly observed address is directly adjacent to an existing basic block for which an entry already exists in the history storage 102 (i.e. it immediately precedes or follows that basic block) and in this circumstance the control circuitry 106 can modify the entry to expand the basic block further include the new address.

Figures 3A, 3B:
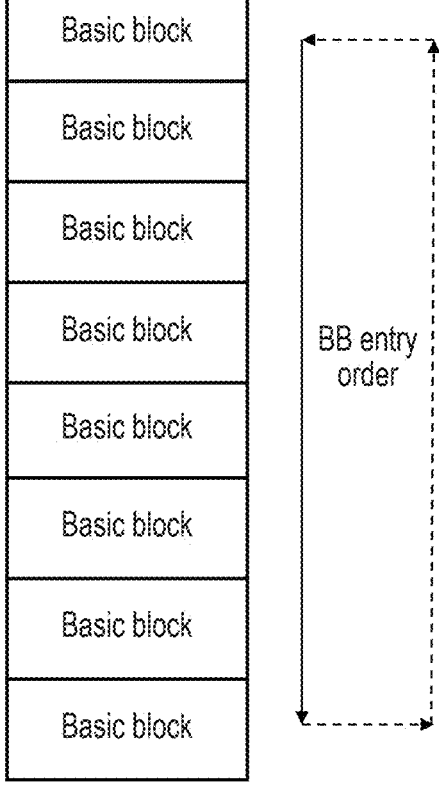
FIGS. 3A and 3B schematically illustrate history storage according to some example configurations.

FIGS. 3A and 3B schematically illustrate history storage according to some example configurations. In particular, these figures show examples of how the basic block entry order is tracked in the history storage. In the example of FIG. 3A, the entry order of the plurality of entries in the history storage circuitry corresponds to an indexing of the history storage circuitry. Hence the order in which the basic blocks are observed corresponds directly to the order in which the entries indicative of those basic blocks are stored in the history storage. In one variant of the example of FIG. 3A, the history storage circuitry is configured as a rolling buffer, as shown by the dashed line, indicating that when one end of the storage is reached the entry order wraps around to the other end of the storage. In the example of FIG. 3B, the entry order of the plurality of entries in the history storage circuitry is indicated by an entry order value (OV) respectively stored in association with each entry of the history storage circuitry. Accordingly, in this example the physical entry order of the entries in the history storage is immaterial and the order of those entries is tracked by reference to the entry order values. Any of the history storage examples discussed herein may configured in accordance with either of the FIGS. 3A and 3B examples.

FIGS. 4A and 4B schematically illustrate history storage according to some example configurations. In particular, these figures show examples of the association of basic blocks with one another, that is the storage of an indication showing the association between an entry-order-older basic block (a "source" basic block) with an entry-order-younger basic block (a destination basic block). Thus as indicated in the example of FIG. 4A, a source basic block #0 has stored in association with it an indication that basic block #3 is a destination basic block for it. A similar association between source basic block #1 and destination basic block #5, and between source basic block #3 and destination basic block #6 is also shown. Accordingly, with these associations established in the history storage, in the event that an address belonging to one of the source basic blocks is observed in the load/prefetch requests, then the prefetcher can be triggered to prefetch the basic block(s) indicated as destination basic block(s) associated with the relevant source basic block. Note that in some configurations, the observation of a single address belonging to one of the source basic blocks is sufficient to trigger the prefetch, whilst in some other configurations the full sequence of addresses forming the source basic block is required to trigger the prefetch. The example shown in FIG. 4B illustrates that each of the entries in the history storage has a confidence value (conf) associated with it. This confidence value can be made use of in particular with respect to destination basic blocks, for example wherein a prefetch operation for a destination basic block is only initiated when the confidence value associated with that destination basic block meets/exceeds a given threshold value. The confidence values can be applied and updated in various ways to support such an approach. In some examples, the confidence values can be reduced periodically, whilst when an already-recorded destination basic block is observed again to follow an already-recorded source basic block, the confidence value associated with that destination basic block is increased.

FIG. 5 schematically illustrates history storage according to some example configurations. The configuration shown shows some entries of the history storage (corresponding to observed basic blocks) being recorded as either a source basic block (basic block #0) or a destination basic block (basic blocks #3-#7). In the example shown the observation of address(es) corresponding to basic block #0 can trigger the prefetching of the set of basic blocks #3-#7. Each of the set of destination basic blocks #3-#7 is also shown to have an associated confidence value, such that the triggering of the prefetching of any of these basic blocks can also be further dependent on the respective confidence value meeting/exceeding the threshold value.

FIG. 6 schematically illustrates history storage according to some example configurations. Here the information stored in the history storage is shown in two parts: a set of entries 150 and a set of associated source/destination/confidence information 151. According to the example shown, observed basic blocks are recorded in the entries 150 of the history storage. Moreover, an entry-order older basic block is set as a source basic block by an appropriate indication ("SRC_0") being stored in the storage 151. Thereafter a set of basic blocks that follow this source basic block, that are each separated by at least a defined minimum number of entries in the entries 150, have corresponding destination indications ("DST_0", "DST_1", etc.) stored in association with the source basic block indication. Each destination indication also has an associated confidence value (conf). In this example configuration, when an indication of a destination basic clock is initially stored, its associated confidence value is set to a default value. A set of destination indications is thus stored in association with the source basic block indication. Once the set of destination indications is filled, a new source basic block is set ("SRC_1") and the process repeats, storing a set of corresponding destination indications ("DST_4", "DST_5", etc.) of subsequent basic blocks separated from the source basic block by at least the defined minimum number of entries. A destination basic block for a first source basic block may itself be a new source basic block allowing for a continuous chain of prefetches. The control circuitry monitors the sequence of request addresses and compares these against the basic blocks stored in the entries 150 of the history storage. When a match is found with a source basic block, prefetching of the destination basic block(s) can be triggered. This may also be dependent on the confidence values of the respective destination basic blocks. Mechanisms can also be provided to update confidence values, such as periodically to decrease the confidence values of all entries, and when an existing destination basic block is seen again to follow its source basic block to increase the confidence of that destination basic block.

When the confidence value of a destination basic block falls below a given threshold, that entry may be replaced by a new entry.

FIG. 7 is a flow diagram showing a sequence of steps according to some example configurations. These steps show an overview of the operation of some of the above examples of history storage and control circuitry. At step 200 content is being retrieved from a memory system. On the basis of observed basic blocks of memory addresses, at step 201 indications of those basic blocks are stored in history storage. An association between an entry-order-older basic block and an entry-order-younger basic block is recorded at step 202, where those respective basic blocks are separated by a minimum number of basic block entries in the history storage. As the retrieval of content from the memory system continues, at step 203 the request addresses involved are monitored. When it is observed, at step 204, that a requested address corresponds to the entry-order-older basic block, this causes the retrieval of content from the memory system corresponding to the entry-order-younger basic block to be triggered.

Figure 8:
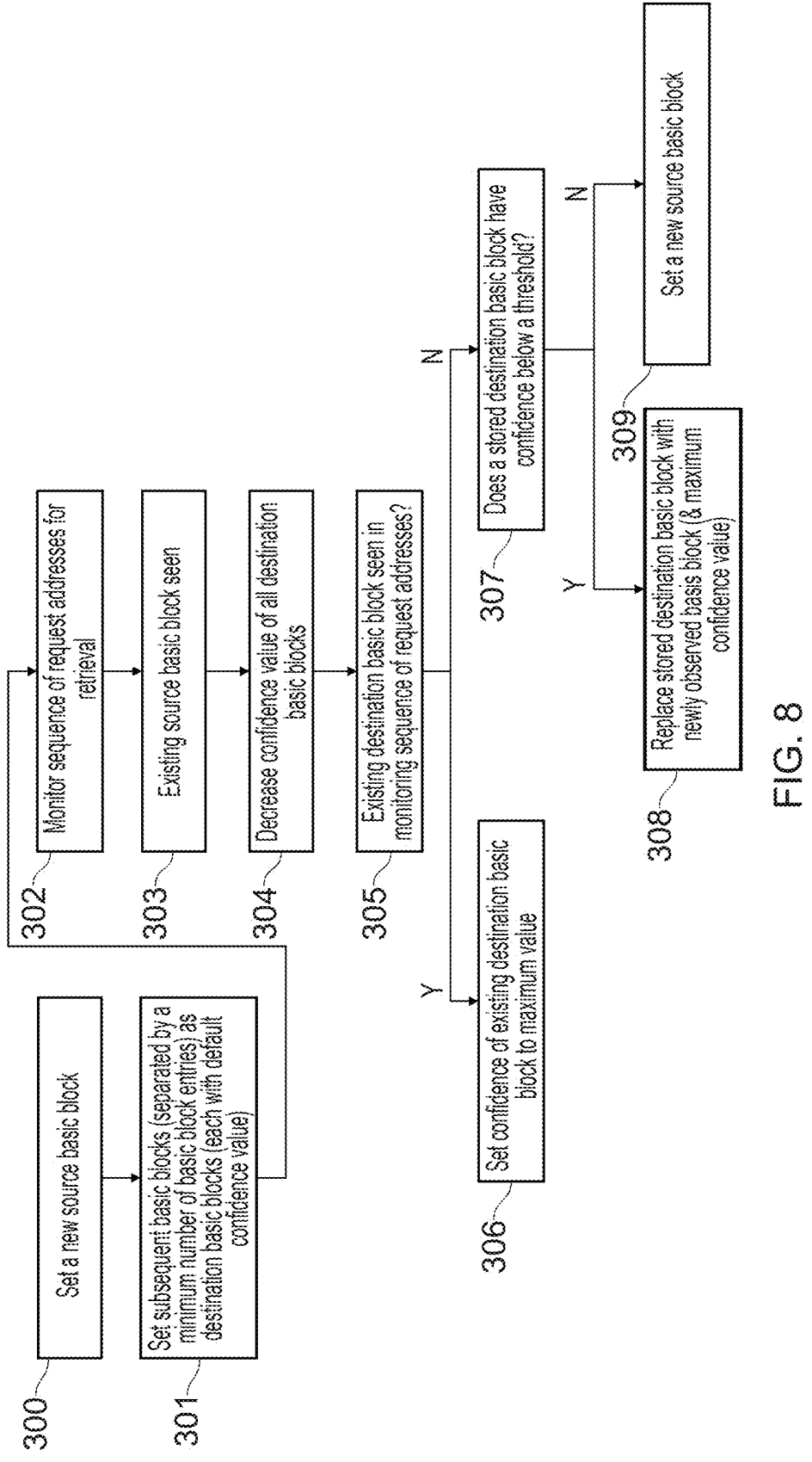
FIG. 8 is a flow diagram showing a sequence of steps according to some example configurations.

FIG. 8 is a flow diagram showing a sequence of steps according to some example configurations. These steps show an overview of the operation of the examples of history storage and control circuitry discussed above with reference to FIG. 6. At step 300, based on the observation of request addresses, a new source basic block is set in history storage. Then at step 301, subsequent basic blocks are set as destination basic blocks associated with the source basic block (with the destination basic blocks being separated by a minimum number of basic block entries in the history storage from the source basic block). Then the retrieval of content from the memory system continues, and step 302 shows the request addresses involved being monitored. When it is observed, at step 303, that an existing source basic block is observed, then at step 304 the confidence values associated with each of the source basic block's destination basic blocks are decreased. Subsequently it is then determined, at step 305, for a following observed basic block, whether that basic block is already a recorded destination basic block. When it is, then at step 306 the confidence of that destination basic block is set to a maximum value. When this newly observed basic block is not already a recorded destination basic block, then at step 307 it is determined if an existing destination basic block has a confidence below a given ("victim") threshold. If such a candidate exists, then at step 308 the existing stored destination basic block is replaced by the newly observed basic block (which has its confidence set to the maximum confidence value). Otherwise, when no such candidate exists, then at step 309 the newly observed basic block is set as a new source basic block.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
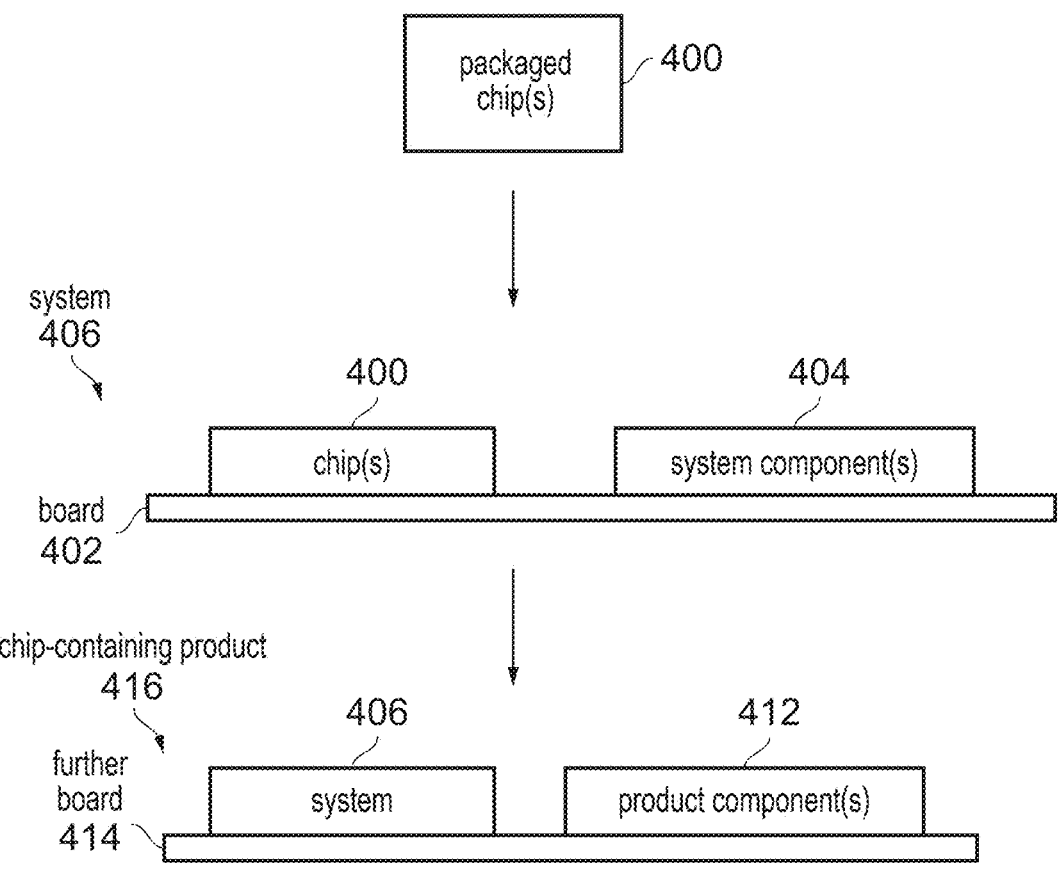
FIG. 9 schematically illustrates a system and a chip containing product according to some configurations of the present techniques.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there are provided apparatuses, methods, systems, chip-containing products and computer-readable storage media. Prefetching retrieves content from a memory system. History storage stores plural entries, each identifying a basic block of memory addresses, wherein the basic block of memory addresses is a contiguous range of memory addresses from which content has been requested to be retrieved from the memory system. An entry order of the plural entries corresponds to a basic block order in which corresponding basic blocks have been requested to be retrieved from the memory system. An entry-order-older basic block is associated with with an entry-order-younger basic block for which respective entries are stored in the history storage circuitry, these basic blocks being separated by at least a defined minimum number of entries in entry order in the history storage. A sequence of request addresses from which content is requested to be retrieved from the memory system is monitored. When a requested address corresponds to the entry-order-older basic block prefetching corresponding to the entry-order-younger basic block is triggered.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:

prefetch circuitry configured to retrieve content from a memory system;

history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and control circuitry configured to:

associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

Clause 2. The apparatus as defined in Clause 1, wherein the entry order of the plurality of entries in the history storage circuitry corresponds to an indexing of the history storage circuitry.

Clause 3. The apparatus as defined in Clause 1, wherein the entry order of the plurality of entries in the history storage circuitry is indicated by an entry order value respectively stored in association with each entry of the history storage circuitry.

Clause 4. The apparatus as defined in any preceding Clause, wherein the history storage circuitry is configured as a rolling buffer.

Clause 5. The apparatus as defined in any preceding Clause, wherein the sequence of request addresses monitored by the control circuitry comprises demand addresses.

Clause 6. The apparatus as defined in any preceding Clause, wherein the sequence of request addresses monitored by the control circuitry comprises prefetch addresses.

Clause 7. The apparatus as defined in any preceding Clause, wherein the entry-order-older basic block and the entry-order-younger basic block are separated by at most a maximum number of entries in the history storage circuitry.

Clause 8. The apparatus as defined in Clause 7, wherein the history storage circuitry is configured to store a plurality of entries that is at least the maximum number of entries.

Clause 9. The apparatus as defined in any preceding Clause, wherein the entry-order-older basic block and the entry-order-younger basic block are separated by at least a predefined static number of entries in the history storage circuitry.

Clause 10. The apparatus as defined in any of Clauses 1-8, wherein a minimum separation of the entry-order-older basic block and the entry-order-younger basic block is a dynamically variable number of entries in the history storage circuitry.

Clause 11. The apparatus as defined in Clause 10, wherein the control circuitry is configured to vary the dynamically variable number of entries in the history storage circuitry in dependence on at least one performance metric.

Clause 12. The apparatus as defined in any of Clauses 1-8, wherein the history storage circuitry is configured to store a confidence value associated with each of the plurality of entries, and wherein causing the prefetch circuitry to retrieve content from the memory system corresponding to the entry-order-younger basic block is dependent on the confidence value associated with the entry-order-younger basic block meeting a confidence threshold.

Clause 13. The apparatus as defined in Clause 12, wherein the control circuitry is configured to associate a set of entry-order-younger basic blocks with the entry-order-older basic block.

Clause 14. The apparatus as defined in Clause 13, wherein the control circuitry is configured, when monitoring the sequence of request addresses from which content is requested to be retrieved from the memory system, and when the requested address in the sequence of request addresses corresponds to the entry-order-older basic block to cause the confidence values associated with the set of entry-order-younger basic blocks to be decreased.

Clause 15. The apparatus as defined in Clause 14, wherein the control circuitry is configured, after the requested address in the sequence of request addresses corresponds to the entry-order-older basic block and when a subsequent requested address in the sequence of request addresses corresponds to one of the set of entry-order-younger basic blocks, to cause the confidence value associated with an entry-order-younger basic block corresponding to the subsequent requested address to be increased.

Clause 16. The apparatus as defined in Clause 15, wherein the confidence value associated with the entry-order-younger basic block corresponding to the subsequent requested address is set to a maximum value.

Clause 17. The apparatus as defined in any of Clauses 13-16, wherein the control circuitry is configured, after the requested address in the sequence of request addresses corresponds to the entry-order-older basic block and when a subsequent requested address in the sequence of request addresses does not correspond to one of the set of entry-order-younger basic blocks, to cause a new entry identifying a new basic block of memory addresses corresponding to the subsequent requested address to replace a victim entry of the set of entry-order-younger basic blocks for which the confidence value is below a victim threshold.

Clause 18. The apparatus as defined in Clause 17, wherein when none of the set of entry-order-younger basic blocks has the confidence value below the victim threshold, the control circuitry is configured to cause a new source entry identifying a new source basic block of memory addresses corresponding to the subsequent requested address to be stored in the history storage circuitry, wherein the control circuitry is then configured to associate a new set of entry-order-younger basic blocks with the new source basic block as the entry-order-older basic block.

Clause 19. A system comprising:
the apparatus of any preceding Clause, implemented in at least one packaged chip;
at least one system component; and
a board,
wherein the at least one packaged chip and the at least one system component are assembled on the board.

Clause 20. A chip-containing product comprising the system of Clause 19, wherein the system is assembled on a further board with at least one other product component.

Clause 21. A method comprising:
retrieving content from a memory system;
storing a plurality of entries in history storage circuitry, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system;
associating an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry;
monitoring a sequence of request addresses from which content is requested to be retrieved from the memory system; and
in response to a requested address in the sequence of request addresses corresponding to the entry-order-older basic block to causing the retrieval of content from the memory system corresponding to the entry-order-younger basic block.

Clause 22. A non-transitory computer-readable medium storing computer-readable code for fabrication of an apparatus comprising:
prefetch circuitry configured to retrieve content from a memory system;
history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and
control circuitry configured to:
associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

We claim:
1. An apparatus comprising:
prefetch circuitry configured to retrieve content from a memory system;
history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and control circuitry configured to:

associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

2. The apparatus as claimed in claim 1, wherein the entry order of the plurality of entries in the history storage circuitry corresponds to an indexing of the history storage circuitry.

3. The apparatus as claimed in claim 1, wherein the entry order of the plurality of entries in the history storage circuitry is indicated by an entry order value respectively stored in association with each entry of the history storage circuitry.

4. The apparatus as claimed in claim 1, wherein the history storage circuitry is configured as a rolling buffer.

5. The apparatus as claimed in claim 1, wherein the sequence of request addresses monitored by the control circuitry comprises demand addresses.

6. The apparatus as claimed in claim 1, wherein the sequence of request addresses monitored by the control circuitry comprises prefetch addresses.

7. The apparatus as claimed in claim 1, wherein the entry-order-older basic block and the entry-order-younger basic block are separated by at least a predefined static number of entries in the history storage circuitry.

8. The apparatus as claimed in claim 1, wherein a minimum separation of the entry-order-older basic block and the entry-order-younger basic block is a dynamically variable number of entries in the history storage circuitry.

9. The apparatus as claimed in claim 8, wherein the control circuitry is configured to vary the dynamically variable number of entries in the history storage circuitry in dependence on at least one performance metric.

10. The apparatus as claimed in claim 1, wherein the history storage circuitry is configured to store a confidence value associated with each of the plurality of entries, and wherein causing the prefetch circuitry to retrieve content from the memory system corresponding to the entry-order-younger basic block is dependent on the confidence value associated with the entry-order-younger basic block meeting a confidence threshold.

11. The apparatus as claimed in claim 10, wherein control circuitry is configured to associate a set of entry-order-younger basic blocks with the entry-order-older basic block.

12. The apparatus as claimed in claim 11, wherein the control circuitry is configured, when monitoring the sequence of request addresses from which content is requested to be retrieved from the memory system, and when the requested address in the sequence of request addresses corresponds to the entry-order-older basic block to cause the confidence values associated with the set of entry-order-younger basic blocks to be decreased.

13. The apparatus as claimed in claim 12, wherein the control circuitry is configured, after the requested address in the sequence of request addresses corresponds to the entry-order-older basic block and when a subsequent requested address in the sequence of request addresses corresponds to one of the set of entry-order-younger basic blocks, to cause the confidence value associated with an entry-order-younger basic block corresponding to the subsequent requested address to be increased.

14. The apparatus as claimed in claim 13, wherein the confidence value associated with the entry-order-younger basic block corresponding to the subsequent requested address is set to a maximum value.

15. The apparatus as claimed in claim 11, wherein the control circuitry is configured, after the requested address in the sequence of request addresses corresponds to the entry-order-older basic block and when a subsequent requested address in the sequence of request addresses does not correspond to one of the set of entry-order-younger basic blocks, to cause a new entry identifying a new basic block of memory addresses corresponding to the subsequent requested address to replace a victim entry of the set of entry-order-younger basic blocks for which the confidence value is below a victim threshold.

16. The apparatus as claimed in claim 15, wherein when none of the set of entry-order-younger basic blocks has the confidence value below the victim threshold, the control circuitry is configured to cause a new source entry identifying a new source basic block of memory addresses corresponding to the subsequent requested address to be stored in the history storage circuitry, wherein the control circuitry is then configured to associate a new set of entry-order-younger basic blocks with the new source basic block as the entry-order-older basic block.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method comprising:

retrieving content from a memory system;

storing a plurality of entries in history storage circuitry, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system;

associating an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry;

monitoring a sequence of request addresses from which content is requested to be retrieved from the memory system; and in response to a requested address in the sequence of request addresses corresponding to the entry-order-older basic block to causing the retrieval of content from the memory system corresponding to the entry-order-younger basic block.

20. A non-transitory computer-readable medium storing computer-readable code for fabrication of an apparatus comprising:

prefetch circuitry configured to retrieve content from a memory system;

history storage circuitry configured to store a plurality of entries, each of the plurality of entries identifying a basic block of memory addresses, wherein the basic block of memory addresses is a contiguous range of memory addresses from which content has been requested to be retrieved from the memory system, wherein the plurality of entries has an entry order corresponding to a basic block order in which corresponding basic blocks have been requested to be retrieved from the memory system; and control circuitry configured to:

associate an entry-order-older basic block with an entry-order-younger basic block for which respective entries are stored in the history storage circuitry, wherein the entry-order-older basic block and the entry-order-younger basic block are separated by at least a defined minimum number of entries in entry order in the history storage circuitry, monitor a sequence of request addresses from which content is requested to be retrieved from the memory system, and in response to a requested address in the sequence of request addresses corresponding to the entry-order-older basic block to cause the prefetch circuitry to retrieve content from the memory system corresponding to the entry-order-younger basic block.

* * * * *